US011386126B1

(12) United States Patent
Lehmann et al.

(10) Patent No.: US 11,386,126 B1
(45) Date of Patent: Jul. 12, 2022

(54) SYSTEM AND METHOD FOR LINKING DATA RECORDS FROM DIFFERENT DATABASES

(71) Applicant: Veeva Systems Inc., Pleasanton, CA (US)

(72) Inventors: Lorenz Lehmann, Hesse (DE); Igor Praznik, Hesse (DE); Alexander Darius Emami-Nemini, Braunschweig (DE)

(73) Assignee: Veeva Systems Inc., Pleasanton, CA (US)

( * ) Notice: Subject to any disclaimer, the term of this patent is extended or adjusted under 35 U.S.C. 154(b) by 184 days.

(21) Appl. No.: 16/779,438

(22) Filed: Jan. 31, 2020

Related U.S. Application Data

(60) Provisional application No. 62/868,815, filed on Jun. 28, 2019.

(51) Int. Cl.
*G06F 16/28* (2019.01)
*G06N 20/00* (2019.01)
*G06F 16/23* (2019.01)

(52) U.S. Cl.
CPC ........ *G06F 16/285* (2019.01); *G06F 16/2379* (2019.01); *G06N 20/00* (2019.01)

(58) Field of Classification Search
CPC .... G06F 16/285; G06F 16/2379; G06N 20/00
USPC .......................................................... 707/737
See application file for complete search history.

(56) References Cited

U.S. PATENT DOCUMENTS

| | | | | |
|---|---|---|---|---|
| 10,891,352 | B1* | 1/2021 | Hane | G06F 40/242 |
| 2020/0050946 | A1* | 2/2020 | Lecue | G06N 5/02 |
| 2020/0176098 | A1* | 6/2020 | Lucas | G06F 40/30 |

* cited by examiner

*Primary Examiner* — Evan Aspinwall

(57) ABSTRACT

Systems and methods for linking HCPs from an MDM system and publication authors from a second source data system. Distances between the HCPs and the publication authors may be determined, and an HCP and a publication author may be connected if their distance is below a threshold. The connected data points may be used to train a machine learning model to determine a probability that an HCP matches a publication author. An upper bound and a lower bound may be set. Data points with the probability over the upper bound may be sent out as matches, data points below the lower bound may be disregarded as not a match, and data points between the upper bound and lower bound may be labeled for manual verification.

12 Claims, 6 Drawing Sheets

SYSTEM AND METHOD FOR LINKING DATA RECORDS FROM DIFFERENT DATABASES

CROSS-REFERENCE TO RELATED APPLICATIONS

The present application claims priority to provisional patent application No. 62/868,815, filed Jun. 28, 2019, entitled "Machine Learning Framework to Provide High Precision Matches," which is hereby incorporated by reference herein for all purposes.

BACKGROUND

The subject technology relates generally to master data management.

Users often need to link data from different sources. In the life science industry, users connect data records of Health Care Providers ("HCP") from one data source (e.g., a master data management ("MDM")) system and speech and publication activity information of HCPs from another data source (e.g., the Pub Med database) to combine profile information of the HCPs and their speech and publication activities.

There are different data linkage approaches. One is rule-based systems, which link data records from different databases based on user defined rules, e.g., if the first name is the same, the last name is the same, the middle name is similar, and the affiliation of the HCP matches the location of the HCP, then it is a match. The problem is that it is not accurate enough, and the error rate could be about 15%. Another approach is manual systems, which have lower error rates, but are slow and expensive.

It is desirable to provide a method for linking data records from different database systems which is more accurate, fast and inexpensive.

SUMMARY

The disclosed subject matter relates to a method for linking data records in a first category from a first source data system and data records in a second category from a second source data system. The method comprises: receiving a plurality of the data records in the first category from the first source data system, wherein a data record in the first category comprises a first type of element and a second type of element. The method comprises: receiving a plurality of data records in the second category from the second source data system, wherein a data record in the second category comprises a first type of element and a second type of element. The method further comprises: determining distances between the first data record in the first category and each of the plurality of data records in the second category; determining distances between the first data record in the second category and each of the plurality of data records in the first category; selecting the distances below a first threshold; creating a connection for each selected distance; creating a data point set, wherein each data point represents a data record in the first category, and a data record in the second category which has a connection with the data record in the first category; receiving classified data points; and training a machine learning model for determining a probability that the first data record in the first category matches the first data record in the second category.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

Figure 1:
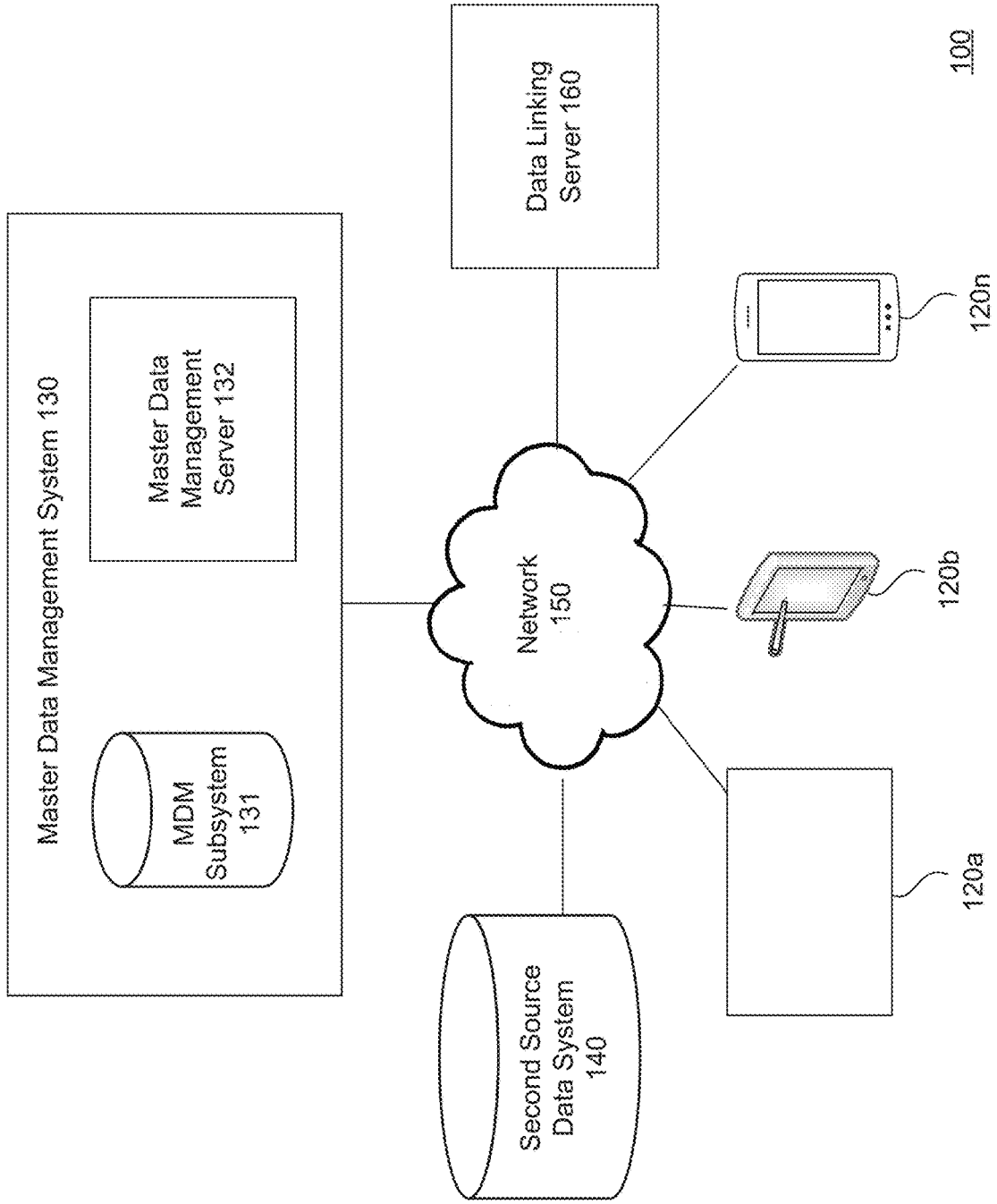
FIG. 1 illustrates an example high level block diagram of a data management architecture wherein the present invention may be implemented.

FIG. 1 illustrates an example high level block diagram of a data management architecture 100 wherein the present invention may be implemented. As shown, the architecture 100 may include a plurality of user computing devices 120a, 120b, ... 120n, an MDM system 130, a second source data system 140, and a data linking server 160, coupled to each other via a network 150. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the second source data system 140 and the MDM 130 via the network 150, and may be any commercially available computing devices including laptop computers, desktop computers, mobile phones, smart phones, tablet computers, netbooks, and personal digital assistants (PDAs).

The MDM 130 may include an MDM subsystem 131 and an MDM server 132. The MDM subsystem 131 may store customer master data which may be provided by an MDM provider. The customer master data may be many types of data which may be used by the enterprise, e.g., accounts, addresses and reference data. In one implementation, the MDM subsystem 131 may store verified HCP and/or HCO information for a pharmaceutical company, as the customer. In one example, the MDM subsystem 131 may store verified physician professional information of cardiologists in the U.S. compiled and/or purchased by a pharmaceutical company. Each HCP may be an account in the MDM subsystem 131.

The master data management server 132 may be used to cleanse, standardize and/or de-duplicate data from different sources to form the single, consolidated customer master data and store the customer master data in the MDM subsystem 131. This may help the enterprise to avoid using multiple and potentially inconsistent versions of the same data. A data steward service may be used to maintain the customer master data in the MDM and make it accurate and up-to-date. Any changes to the customer master data will be displayed on the data steward interface 1328 shown in FIG. 3, so that a data steward may check the changes and update the customer master data when the changes are verified.

In one implementation, the MDM 130, including the customer master data in the MDM subsystem 131, may be provided to the customer by an MDM provider as a software as a service ("SaaS"). In addition, the MDM 130 may be a cloud based multi-tenant system.

The second source data system 140 may an external data management system, or a data storage system if the data is downloaded from an external source, e.g., a website.

Figure 5A:
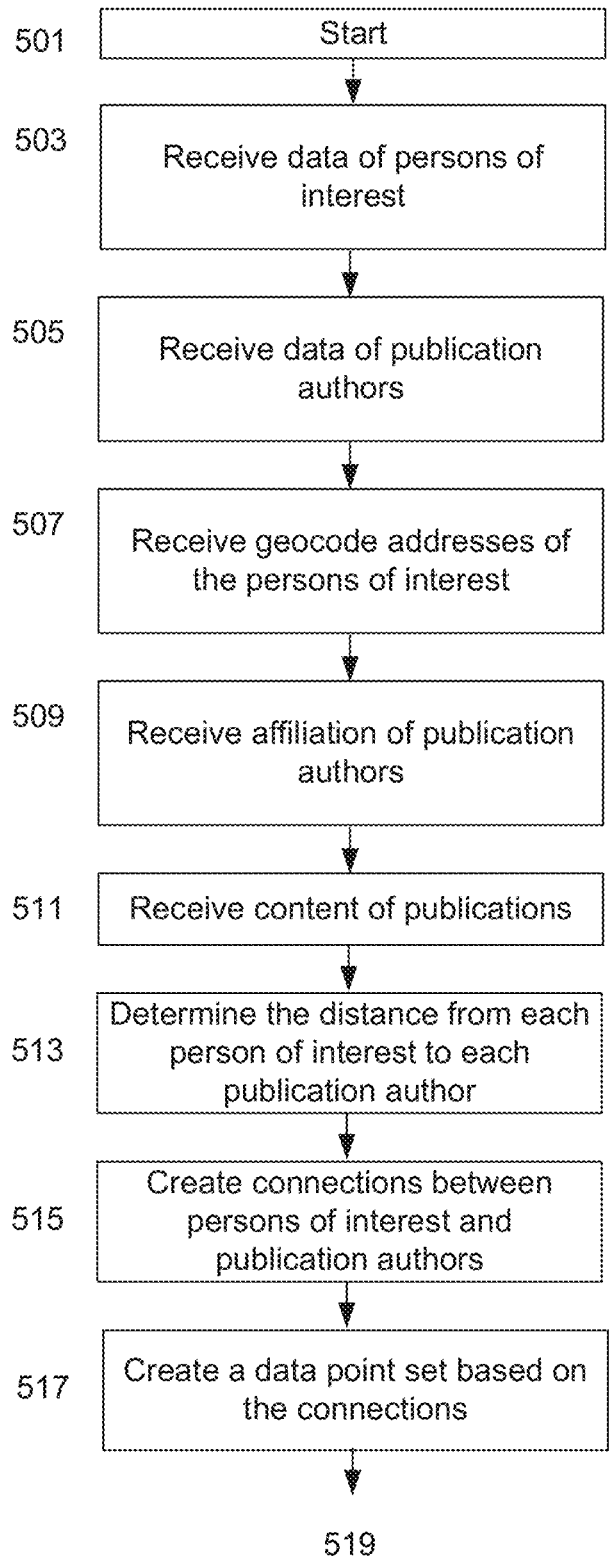
FIGS. 5A and 5B illustrate an example flowchart of a method for linking data records from different sources according to one embodiment of the present invention.
Figure 5B:
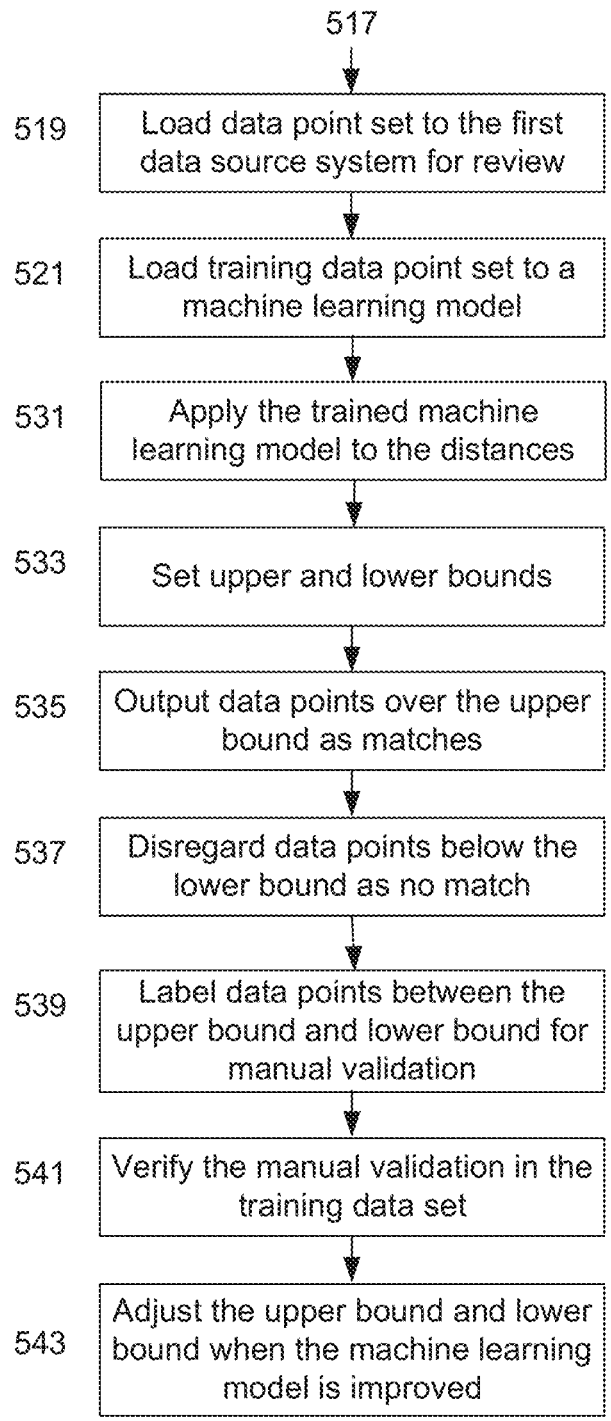

The data linking server 160 may control the process for linking data records from the MDM 130 and the second source data system 140, as will be described in detail with reference to FIGS. 5A and 5B.

Figure 2:
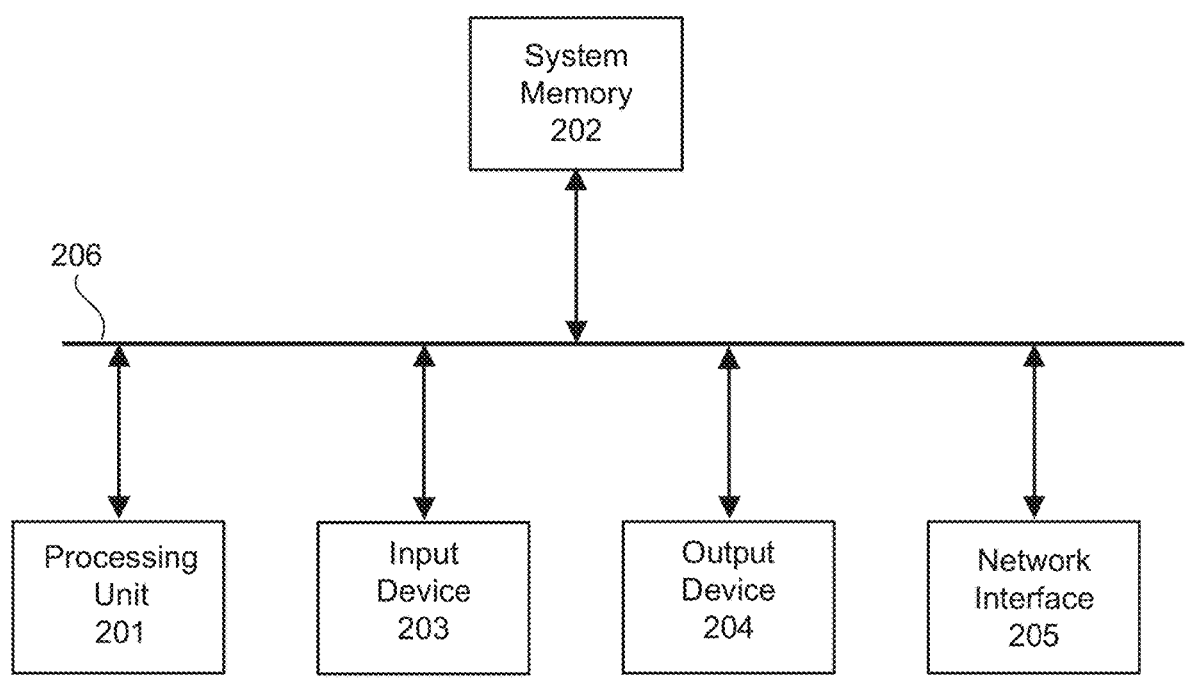
FIG. 2 illustrates an example high level block diagram of a computing device.

FIG. 2 illustrates an example high level block diagram of a computing device 200 which can be used as the user computing devices 120a-120n, the master data management server 132, and/or the data linking server 160 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
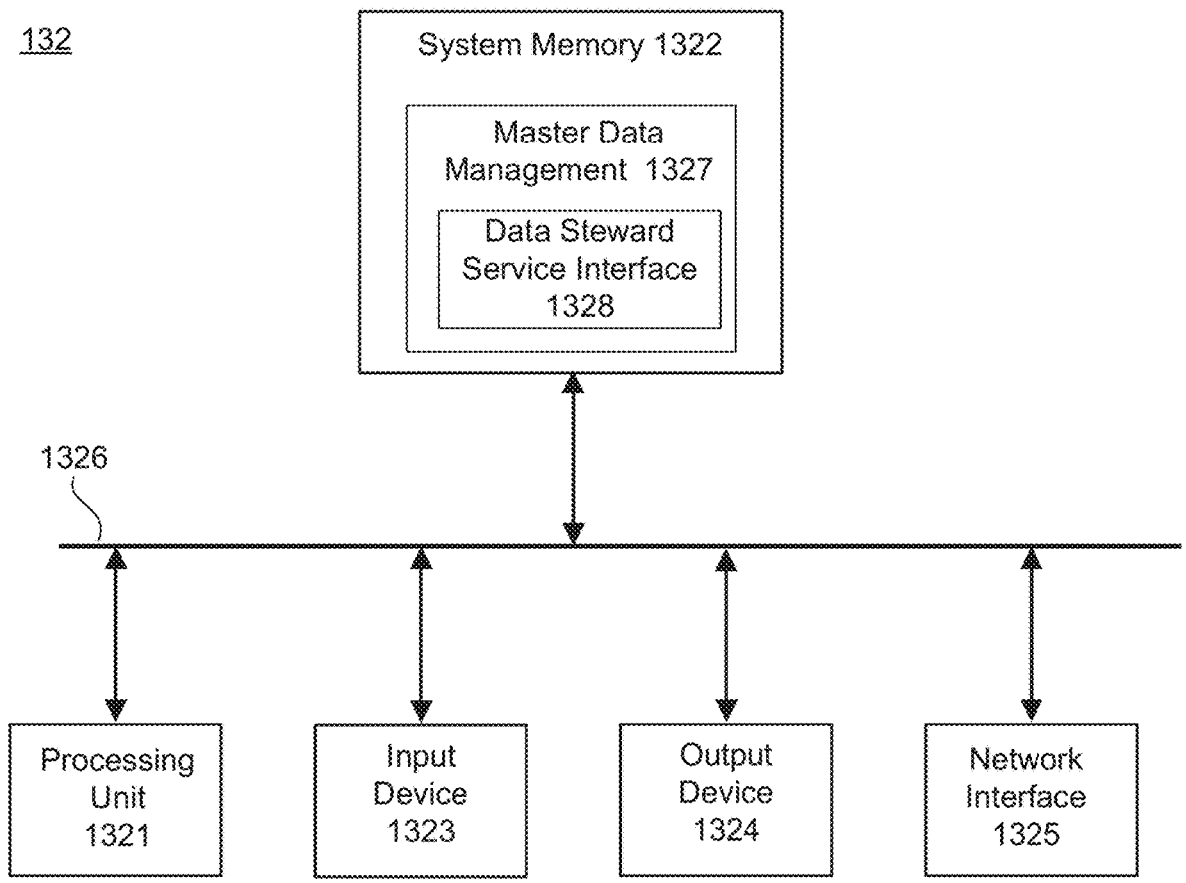
FIG. 3 illustrates an example high level block diagram of an MDM server according to one embodiment of the present invention.

FIG. 3 illustrates an example high level block diagram of the master data management server 132. The master data management server 132 may be implemented by the computing device 200, and may have a processing unit 1321, a system memory 1322, an input device 1323, an output device 1324, and a network interface 1325, coupled to each other via a system bus 1326. The system memory 1322 may store a master data management module 1327, which may be used to cleanse, standardize and de-duplicate HCP and/or HCO data from various sources to form the single, consolidated customer master data.

The master data management module 1327 may control a data steward service interface 1328, which may display records to be verified, merged or updated, receive updates to the customer master data, and store the updates to the MDM subsystem 131.

The pharmaceutical companies may purchase service from an MDM provider to use the MDM 130, including the customer master data in the MDM subsystem 131. In one implementation, the MDM subsystem 131 may store address and license information of all physicians in a state, or all physicians with a specialty.

Figure 4:
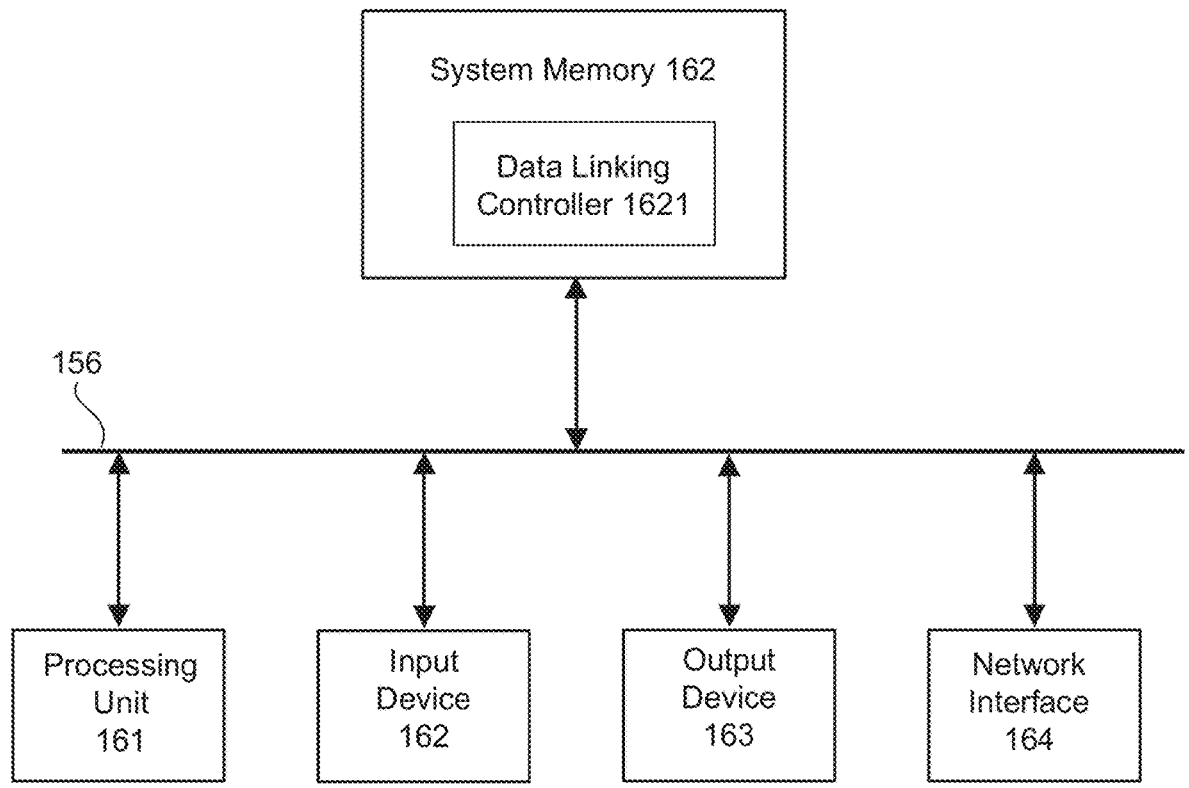
FIG. 4 illustrates an example high level block diagram of a data linking server for linking data records from different sources according to one embodiment of the present invention.

FIG. 4 illustrates an example high level block diagram of a data linking server according to one embodiment of the present invention. The data linking server 160 may be implemented by the computing device 200, and may have a processing unit 161, a system memory 162, an input device 163, an output device 164, and a network interface 165, coupled to each other via a system bus 166. The system memory 162 may store a data linking module 1621 for controlling the process described with reference to FIGS. 5A and 5B.

The present invention implements a tiered approach for linking data records from different sources, which combines machine learning with manual curation to reach an error rate of about 2% while constantly reducing manual intervention. FIGS. 5A and 5B illustrate an example flowchart of a method for linking data records from different data sources according to one embodiment of the present invention. The method may start at 501.

At 503, a set of persons of interest with profile information including their names (e.g., John Smith), and specialties (oncology), may be loaded from the MDM system 130.

At 505, a set of publication authors may be loaded from the second source data system 140, which may be, e.g., the PubMed system. Information of the publication authors may include their names (e.g., Jay Smith). In one embodiment, the set of publication authors may be limited to publication authors in the last 10 years or a geographic area.

At 507, geocode addresses of the persons of interest may be obtained from the MDM system 130.

At 509, affiliations of authors may be obtained from the second source data system 140.

At 511, content may be extracted from publications in the second source data system 140 to understand their subjects, e.g., if it is about cancer, or diabetes. The content may be extracted by using author name, title, abstract and MeSH terms.

At 513, the distances between the persons of interest and authors may be calculated, e.g., by a rule based on similarity of names, geographic distances, and/or contextual distances related to specialty to publication content. In one embodiment, for each person of interest, the distance between his/her first name and the first name of each publication author, the distance between his/her last name and the last name of each publication author, the distance between his/her geographic location and the geographic location of each publication author, the distance between his/her specialty mapped to keywords and the keywords in publication content t of each publication author may be calculated, and the distances may be combined into one distance between the person of interest and the publication author.

At 515, connections between persons of interest and authors may be created based on their distances. In one embodiment, the connection between a person of interest and an author may be created if the distance is below a threshold, e.g., 0.5.

At 517, a data point set may be created based on the connections, and each data point may represent a pair of person of interest and publication author which are linked by a connection and are potentially a match.

Manually curated rules (decision trees) may be applied to the connections to classify the data points as match or as suspect. At 519, all data points may be loaded into the MDM system 130 for manual review, and be classified as match or not a match.

At 521, the manually classified data points and their distances may be used as a training data point set to train a machine learning model. The machine learning model may be any machine learning model that can be trained with data to provide a probability that a person of interest and a publication author are a match. Examples may include the boosted trees machine learning model, the neural network machine learning model, and the random forests machine learning model.

At 531, the trained machine learning model may be applied to the distances between the persons of interest and publication authors, and predict the probability that the person of interest is one of the publication authors, instead of only provide a simple classification into a match or not.

At 533, upper and lower bounds for the probability that the person of interest is one of the publication authors may be set. In one example, the upper bound is 85% and the lower bound is 15%.

At 535, all data points with a probability over the upper bound (e.g., 85%) may be sent directly to end users as a match without manual validation.

At 537, all data points below the lower bound (e.g., 15%) may be disregarded as not a match, without being sent to end users or queued for manual validation.

At 539, all data points with a probability between the upper bound (e.g., 85%) and the lower bound (e.g., 15%) may be flagged for manual validation.

At 541, the manual verification results may be verified in the training data set again.

At 543, if the machine learning model improves based on the new training data, the upper and lower bounds may be adjusted accordingly. When there are new manually verified matches, a new training data point set may be created. The machine learning model may be trained again, and the upper bound and lower bound may be adjusted to keep the target percentage of correctness and completeness constant (measured as precision and recall).

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for linking data records in a first category from a first source data system and data records in a second category from a second source data system, the method comprising:
   at a data linking controller in a server, receiving a plurality of the data records in the first category from the first source data system, wherein a data record in the first category comprises a first type of element and a second type of element;
   at the data linking controller, receiving a plurality of data records in the second category from the second source data system, wherein a data record in the second category comprises the first type of element and the second type of element, and wherein at least a data record in the first category from the first source data system and at least a data record in the second category from the second source data system are about a same individual;
   determining by the data linking controller, distances between the first data record in the first category and each of the plurality of data records in the second category;
   determining by the data linking controller distances between the first data record in the second category and each of the plurality of data records in the first category;
   selecting by the data linking controller the distances below a first threshold;
   creating by the data linking controller a connection for each selected distance;
   creating by the data linking controller a data point set, wherein each data point represents a data record in the first category, and a data record in the second category which has a connection with the data record in the first category;
   receiving classified data points; and
   training a machine learning model for determining a probability that the first data record in the first category matches the first data record in the second category.

2. The method of claim 1, further comprising: determining a first distance between the first type of element of a first data record in the first category and the first type of element of a first data record in the second category.

3. The method of claim 2, further comprising: determining a second distance between the second type of element of the first data record in the first category and the second type of element of the first data record in the second category.

4. The method of claim 3, further comprising: determining a distance between the first data record in the first category and the first data record in the second category based on the first distance and the second distance.

5. The method of claim 1, further comprising: setting an upper bound for a probability that the first data record in the first category matches the first data record in the second category.

6. The method of claim 5, further comprising: outputting a data record in the first category and its connected data record in the second category as a match if the probability that they match each other is over the upper bound.

7. The method of claim 5, further comprising: setting a lower bound for the probability that the first data record in the first category matches the first data record in the second category.

8. The method of claim 7, further comprising: disregarding a data record in the first category and its connected data record in the second category if the probability that they match each other is below the lower bound.

9. The method of claim 7, further comprising: sending a data record in the first category and a data record in the second category to the second data source system for review if the probability that they match each other is between the upper bound and the lower bound.

10. The method of claim 7, further comprising: improving the machine learning model with new data records.

11. The method of claim 10, further comprising: adjusting the upper bound and lower bound for constant percentage of correctness.

12. The method of claim 1, wherein the first source data system is a master data management system.

* * * * *